United States Patent Office 3,073,861

Patented Jan. 15, 1963

1

3,073,861
UREIDO-SUBSTITUTED ARYLSULFUR PENTAFLUORIDES

Maynard S. Raasch, Wilmington, Del., assignor to E. I. du Pont de Nemours and Company, Wilmington, Del., a corporation of Delaware No Drawing. Filed Aug. 13, 1959, Ser. No. 833,379
5 Claims. (Cl. 260—552)

This invention relates to a new class of aryl ureas containing sulfur and fluorine which are of interest because of their useful biological activity. The general activity of these compounds has been demonstrated in such diverse fields as algal control on soil and in water, bacterial control, expulsion of intestinal worms, inhibition of chlorophyll formation in plants and selective weed control. The invention is also concerned with methods for preparing such compounds and with their use to produce albinism in chlorophyll-containing organisms.

The new aryl ureas of this invention have a sulfur pentafluoride group ($—SF_5$) bonded to a nuclear carbon of an aromatic group. A characteristic structure of my novel compounds is an aromatic group having bonded to at least one nuclear carbon a hexavalent sulfur atom which is bonded to five fluorine atoms, and to another nuclear carbon a ureido group in which the nitrogen bonded to the nuclear carbon bears one hydrogen and the remaining nitrogen in the ureido group bears at least one hydrocarbon, halohydrocarbon or aryl sulfur pentafluoride substituent.

The new class of compounds of the invention can be represented by the general formula

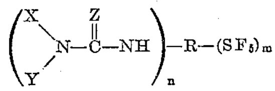

where R is an aromatic group which can be monocyclic or polycyclic and in which the aromatic rings can be separate or fused; $n$ and $m$ are positive whole numbers at most equal to 3, i.e., $n$ and $m$ are the same or different and represent 1, 2, or 3; and Z is a member of the class consisting of oxygen and sulfur. The sulfur pentafluoride ($—SF_5$) and ureido groups

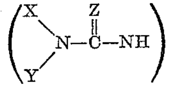

are bonded to nuclear carbons of an aromatic ring which nuclear carbons are not necessarily members of the same aromatic ring. X represents hydrogen, a hydrocarbyl group or a halohydrocarbyl group; Y represents a hydrocarbyl group, a halohydrocarbyl group or an arylsulfur pentafluoride group. The hydrocarbyl groups can have open or closed chains. In a preferred form of the invention, X and Y are alkyl, aryl or haloaryl groups of at most 8 carbons.

The aromatic group, R, is carbocyclic, i.e., the nuclear atoms are carbon atoms. Aromatic nuclei which are illustrative of the R group are phenyl, naphthyl, anthryl, phenanthryl, diphenyl, p-terphenyl, p-quaterphenyl, and the like. The nuclear carbons in the aromatic group which are not bonded to sulfur pentafluoride groups and ureido groups can be bonded to other substituents, e.g., hydrocarbon, halogen, nitro, cyano, ester, amide, alkoxy, and alkoxycarbonyl groups. Substituents such as methyl, propyl, cyclohexyl, chlorine, bromine or fluorine can be present. These substituents are not a critical or characterizing feature of the new compounds. As stated earlier, the characteristic feature is the presence of at least one sulfur pentafluoride group and one ureido group, as defined above.

2

The following compounds are illustrative of the new compounds of the invention: m-(3,3-dimethylthioureido)-phenylsulfur pentafluoride, m-(3,3-dibutylureido)phenylsulfur pentafluoride, p-(3-cyclohexylureido)phenylsulfur pentafluoride, p-(3,3-dioctylthioureido)phenylsulfur pentafluoride, 2,2′-bis(3,3-dimethylureido)-4,4′-biphenylene-bis(sulfur pentafluoride), 4′-(3,3-dimethylureido)-4-biphenylsulfur pentafluoride, 4′-(3-ethylureido)-4″-(p-terphenyl)sulfur pentafluoride, 8-(3,3-dibutylureido)-2-naphthylsulfur pentafluoride, 4-(3,3-dipropylureido)-2-naphthylsulfur pentafluoride, 8-(3,3-diethylthioureido)-2-naphthylsulfur pentafluoride, p-(3,3-dimethylureido)-o-ethoxycarbonylphenylsulfur pentafluoride, 4′-(3-propylureido)-3,5-diphenylenebis(sulfur pentafluoride), 4-(3-phenylureido)-1-anthrylsulfur pentafluoride, p-[3-(p-chlorophenyl)ureido]phenylsulfur pentafluoride, p-(3,3-dimethylureido)-o-methylphenylsulfur pentafluoride, p-(3,3-dicyclohexylureido)-m-chlorophenylsulfur pentafluoride, p-(3,3-dipropylthioureido)-m-chlorophenylsulfur pentafluoride, m-(3,3-dioctylureido)phenylsulfur pentafluoride, 5-(3-amylureido)-1,3-phenylenebis(sulfur pentafluoride), p-(3-methylureido)-o-cyanophenylsulfur pentafluoride, p-(3,3-dimethylureido)-o-methoxyphenylsulfur pentafluoride. p-(3,3-diethylureido)-o-(N,N-dimethylcarbamyl)phenylsulfur pentafluoride, p(3-allylureido)phenylsulfur pentafluoride, and p-(3-methylureido)-o-carboethoxyphenylsulfur pentafluoride.

In an especially preferred group of the new compounds of the invention, R, in the generic formula, is a monocyclic aryl group having bonded to nuclear carbons 1 to 2 sulfur pentafluoride groups and a ureido group in which the nitrogen in the 3-position bears at least one aliphatically saturated group which is a hydrocarbon or halohydrocarbon of up to 8 carbons, any remaining substituents on the monocyclic aryl group being lower alkyl, halogen or lower alkoxy groups. The compounds in this preferred group can be obtained in good yield from intermediates which are readily available or easily obtained.

The new compounds of the invention are generally white crystalline solids which melt above 100° C. They are soluble in hydrocarbons, halogenated hydrocarbons, ketones and alcohols.

The ureido-substituted arylsulfur pentafluorides are obtained by a number of well recognized and conventional procedures each of which employs an amino-substituted arylsulfur pentafluoride as one reactant. In one process, the aminoarylsulfur pentafluoride is reacted with a carbamyl chloride as illustrated by the following equation:

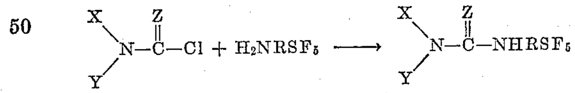

This method is of general application and is particularly useful for preparing N,N-disubstituted ureido compounds. The reaction is usually conducted in a solvent in the presence of an acid acceptor, e.g., pyridine or dimethylaniline. Sufficient heat is applied to bring the reaction to completion. In the above process, the aminoarylsulfur pentafluoride can, if desired, be used in the form of its salt with an inorganic acid, e.g., the hydrochloride.

In a second process, which is basically a medification of the preceding process, the aminoarylsulfur pentafluoride hydrochloride is reacted with phosgene and then with an amine. The reaction is represented by the following equations:

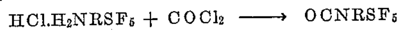

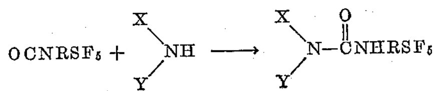

This process is generally conducted in an inert solvent, e.g., an ether, optionally in the presence of an acid acceptor. It is not essential to isolate the intermediate isocyanate. This procedure can be employed generally and it is particularly useful for preparing both N-monosubstituted and N,N-disubstituted ureido compounds.

A third process consists in reacting an aminoarylsulfur pentafluoride with an organic isocyanate or isothiocyanate, as shown by the following equation:

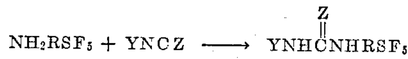

The conditions for conducting this reaction are described fully in standard textbooks on organic preparations. The method is particularly effective for preparing ureido compounds of the invention in which X in the generic formula is hydrogen.

The common reactant in each of the above processes, i.e., the aminoarylsulfur pentafluoride, represents a class of compounds whose preparation has not been described previously in the literature. These compounds are obtained by several procedures. A method of general application consists in reducing the nitro group in nitroarylsulfur pentafluorides by conventional and well known methods, e.g., by a catalytic hydrogenation process employing a platinum oxide catalyst.

The nitroarylsulfur pentafluorides from which the amino compounds are prepared, are obtained by reacting a nitroaryl disulfide or a nitroarylsulfur trifluoride with silver difluoride at a temperature of at least 115° C. There can be present in the nitroaryl compounds more than one nitro group, disulfide (—S—S—) group or sulfur trifluoride group. Preferably, there are at most three of each of these groups on the aryl compound. The mechanism of this reaction is not clearly understood but it can be represented by the following equation for an aryl compound having one disulfide linkage:

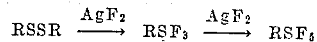

In this equation, R represents an aromatic group which bears at least one nitro group bonded to a nuclear carbon of an aromatic ring. It is evident from the above equation that a nitroarylsulfur trifluoride, if available, can be employed as a starting reactant in place of the disulfide, and the use of a nitroarylsulfur trifluoride represents a modification of the broad process employing a disulfide. This method of preparation, starting with either the disulfide or the sulfur trifluoride, is broadly applicable for preparing nitroarylsulfur pentafluorides.

In the operation of the process employing a nitroaryl diesulfide, it is desirable although not essential to heat the reaction mixture in two steps. In the first step, the mixture of disulfide and silver difluoride is heated in a suitable solvent for a short period at a temperature which is generally below 100° C. The solvent is then removed and the reaction mixture, which contains principally the nitroarylsulfur trifluoride at this stage, is heated for an additional period to 115–150° C. The reaction product is then purified by conventional procedures, e.g., by distillation through an efficient fractionating column, by crystallization, or by chromatography. For the initial heating period, the preferred temperature range is 40–75° C.; for the second heating period, the preferred temperature range is 125–135° C. The time of heating in each step is not critical and will generally be from 0.5 to 24 hours.

Silver difluoride is preferably used in excess although the proportions in which the reactants are used are not critical. In general, the molar ratio of the silver difluoride to the disulfide will lie between about 5:1 and 30:1; the preferred ratio lies between about 10:1 and 20:1.

The solvent employed should be unreactive toward silver difluoride under the reaction conditions. The preferred solvents are fully halogenated hydrocarbons in which the halogens are chlorine or fluorine and which boil above 30° C. and below 100° C. However, solvents which boil higher than 100° C. are operable and can be employed. Removal of the solvent while heating the reactants to 115° C. or higher is solely a matter of convenience and is not essential for operability of the process. It is essential that a final reaction temperature of at least 115° C. be employed.

Optionally, the mixture of nitroaryl disulfide and silver difluoride can be heated in the absence of a solvent in one step to 115° C. or higher. This procedure is operable and the desired nitroarylsulfur pentafluorides are obtained, although yields of the nitroarylsulfur pentafluorides are generally lower than yields obtained by a process which employs a solvent.

The disulfides employed in the process are obtained by conventional procedures described in the literature. The nitro group or groups can be bonded to any carbon in the aromatic ring, except, of course, the carbon bonded to the sulfur of the disulfide group. The nitro groups do not take part in the reaction and appear unchanged in the final product. This method of preparation, therefore, represents a versatile process for preparing nitroarylsulfur pentafluorides which can be reduced to aminoarylsulfur pentafluorides having amino substituents in any desired position on the aromatic group.

The process employing a disulfide or a sulfur trifluoride is preferably conducted under anhydrous conditions in a vessel whose inner surfaces are resistant to attack by hydrogen fluoride and silver difluoride, for example, poly(tetrafluoroethylene) resin, platinum or copper.

The nitroarylsulfur pentafluorides can also be prepared by nitrating an arylsulfur pentafluoride by well known procedures, e.g., by using nitric acid-sulfuric acid mixtures. The arylsulfur pentafluoride which is used as a reactant in this procedure is obtained by the action of silver difluoride on a diaryl disulfide at a temperature of at least 115° C.

Reduction of the nitroarylsulfur pentafluorides to aminoarylsulfur pentafluorides is effected by well known and established procedures which are discussed in many texts, e.g., Ellis, "Hydrogenation of Organic Substances", Chap. XXV, 3rd Ed., D. Van Nostrand Co. (1930). The compounds can be reduced under hydrogen pressure in the presence of a broad range of catalysts such as nickel, tin, platinum, titania, palladium, sodium and ammonium polysulfides and sodium and ammonium thiosulfates. Solvents generally are employed in the reduction process, e.g., ethanol, ethyl acetate, and acetone. The manner in which the reduction is performed is not critical in view of the stability of the sulfur pentafluoride group.

The following examples illustrate (*a*) the preparation of typical aminoarylsulfur pentafluorides which are employed as reactants, (*b*) the preparation of representative ureido-substituted arylsulfur pentafluorides, and (*c*) formulations containing ureido-substituted arylsulfur pentafluorides as active ingredients. In each of the examples the proportions of reactants are expressed as parts by weight unless otherwise stated. In the structural formulas given for the compounds the ring or nuclear carbons are not shown but it is understood that these carbons are present. The valences of nuclear carbons which are not satisfied by designated substituents are satisfied by hydrogen. Examples identified by letters and arabic numbers describe the preparation of the amino compounds; examples identified by Roman numbers describe the preparation of ureido-substituted compounds and their use.

EXAMPLE A

(1) *Preparation of p-Nitrophenylsulfur Pentafluoride*

A copper reaction vessel (capacity, 1000 parts of water) which is equipped with a condenser made of poly(tetrafluoroethylene) resin and a stainless steel stirrer, is charged with 46.2 parts of bis(p-nitrophenyl)- disulfide, 260 parts of silver difluoride and about 312 parts of trichlorotrifluoroethane ("Freon" 113). The reaction mixture is heated with stirring to reflux temperature for one hour. The trichlorotrifluoroethane is removed by distillation and the residue is heated for 2 hours at 120–130° C. After cooling about 15 hours, the reaction mixture is extracted with three portions of carbon tetrachloride of about 100 parts each. The solvent extracts are combined and the solvent is removed by distillation. There remains a residue of yellow oil and orange solid which is subjected to evaporative distillation at about 80° C. and 1–2 mm. pressure to yield 8.6 parts of p-nitrophenylsulfur pentafluoride ($NO_2C_6H_4SF_5$). The compound, a pale yellow liquid, is further purified by distillation through an efficient fractionating column. It boils at 89.3° C./3.8 mm. and has a refractive index, $n_D^{25}$ 1.429. On standing, the pure liquid crystallizes into large prisms which are recrystallized from pentane. The crystals melt at 37.5–38.5° C. The structure of the compound is confirmed by nuclear magnetic resonance, infrared and ultraviolet spectra and by elemental analysis.

*Analysis.*—Calc'd for $C_6H_4NO_2SF_5$: C, 28.9; H, 1.66; N, 5.63; S, 12.87; F, 38.1. Found: C, 29.1; H, 1.85; N, 5.21; S, 12.94; F, 38.7.

(2) *Preparation of p-Aminophenylsulfur Pentafluoride*

A Parr hydrogenation apparatus is employed in this process. A pressure vessel (capacity, 500 parts of water) is charged with 8.3 parts of p-nitrophenylsulfur pentafluoride, 78 parts of absolute ethanol, approximately 5 parts of a 5.5 N solution of hydrogen chloride in ethanol and 0.3 part of a commercially available platinum oxide catalyst. The charged reaction vessel is flushed with hydrogen, then pressured to 40 lbs. with hydrogen and shaken for approximately 30 minutes. The reaction vessel is then charged with 0.2 part of fresh platinum oxide and again shaken under hydrogen at 40 lbs. pressure for 60 minutes. The reaction mixture is filtered and the ethanol removed by evaporation at room temperature under an atmosphere of nitrogen. The solid product which remains is triturated with about 75 parts of ethyl ether, the ether is removed by filtration and the solid is washed thoroughly with ether. There is obtained 8.5 parts of the hydrochloride of p-aminophenylsulfur pentafluoride as a fine white powder. The identity of the compound is confirmed by the infrared spectrum and by elemental analysis.

*Anal.*—Calc'd for $C_6H_7NSF_5Cl$: C, 28.2; H, 2.76; N, 5.48; S, 12.6; F, 37.2; Cl, 13.9; M.W., 255.6. Found: C, 28.5; H, 3.00; N, 5.53; S, 12.5; F, 37.2; Cl, 12.5; M.W., 255.0.

To obtain the free amine compound, i.e., p-aminophenylsulfur pentafluoride, 3.0 parts of the hydrochloride obtained as described in the preceding paragraph is added in small portions with vigorous stirring to about 60 parts of a 10% aqueous solution of sodium carbonate which is covered with a layer of ethyl ether (about 20 parts). After addition is complete the ether layer is separated and the aqueous layer is extracted twice with ethyl ether. The ether extracts are combined, dried over anhydrous magnesium sulfate, filtered and the ether removed by distillation. The solid residue is dissolved in about 40 parts of pentane and the solution is chilled in ice. There is obtained 1.1 parts of p-aminophenylsulfur pentafluoride as white needle-like crystals which, after drying, melt at 67.5–68.0° C. The identity of the compound is confirmed by the infrared nuclear magnetic resonance and ultraviolet spectra and by elemental analysis.

*Anal.*—Calc'd for $C_6H_6NSF_5$: C, 32.9; H, 2.76; N, 6.40; S, 14.6; F, 43.3; M.W., 219.2. Found: C, 33.8; H, 2.85; N, 6.31; S, 13.6; F, 43.3; M.W. 221.

(3) A glass reaction vessel, equipped with a magnetic stirrer, is charged with 0.6–0.7 part of p-nitrophenylsulfur pentafluoride, 20 parts of absolute ethanol and 0.3–0.5 part of platinum oxide catalyst. The mixture is stirred to dissolve the nitrophenylsulfur pentafluoride and the reaction vessel is connected to a source of hydrogen. The mixture is stirred under a slight positive hydrogen pressure until absorption of hydrogen is substantially complete. The ethanol is removed by evaporation leaving crude p-aminophenylsulfur pentafluoride as a crystalline orange-brown solid.

A total of 5.56 parts of p-nitrophenylsulfur pentafluoride is reduced as described in the preceding paragraph to yield 5.7 parts of crude product. The crude product is dissolved in a pentane-ether mixture and chilled. A small quantity of an orange-colored crystalline solid which precipitates is removed by filtration and discarded. The filtrate is evaporated and there is obtained 3.94 parts of p-aminophenylsulfur pentafluoride. The product is best isolated in pure form as the hydrochloride by dissolving in ether and bubbling dry hydrogen chloride gas through the ether solution. There is obtained 2.62 parts of the hydrochloride of p-aminophenylsulfur pentafluoride, a fine white powder which does not melt at 160° C. but gradually decomposes and sublimes on heating.

*Anal.*—Calc'd for $C_6H_7NSF_5Cl$: C, 28.2; H, 2.76; N, 5.48; S, 12.6; F, 37.2; Cl, 13.9. Found: C, 28.4; H, 2.87; N, 5.42; S, 12.2; F, 36.9; Cl, 13.5.

EXAMPLE B

The procedure of Example A is repeated employing the meta-nitro-substituted compound in place of the para-nitro-substituted compounds of parts A–1 and A–2. There is obtained in 87–94% yield the hydrochloride of m-aminophenylsulfur pentafluoride as a fine white powder whose identity is confirmed by infrared, nuclear magnetic resonance and ultraviolet spectra and by elemental analysis.

*Anal.*—Calc'd for $C_6H_7NSF_5Cl$: C, 28.2; H, 2.76; N, 5.48; S, 12.6; F, 37.2; Cl, 13.9; M.W. 255.6. Found: C, 28.5; H, 3.16; N, 5.45; S, 12.9; F, 37.4; Cl, 14.3; M.W., 257.0.

The free m-aminophenylsulfur pentafluoride is obtained as described in Example A, Part 2. The amine, which is purified by crystallization from pentane at about −50° C. is obtained as white crystals, melting at 34–35° C. The compound is further purified by distillation, boiling at 86.5° C./3.2 mm.; $n_D^{26}$ 1.4821; M.P. 37° C. The identity of the compound is confirmed by nuclear magnetic resonance, infrared and ultraviolet spectra and by elemental analysis.

*Anal.*—Calc'd for $C_6H_6NSF_5$: C, 32.9; H, 2.76; N, 6.40; S, 14.6; F, 43.3; M.W. 219.2. Found: C, 31.1; H, 3.17; N, 6.62; S, 15.0; F, 44.3; M.W., 221.5.

EXAMPLE C

This example illustrates the preparation of an intermediate compound containing a plurality of sulfur pentafluoride groups on the aryl nucleus. The preparation of the disulfide used as a reactant is also described.

(1) *Preparation of a Polysulfide*

A reaction vessel fitted with a stirrer is charged with about 260 parts of 55% aqueous hydrogen iodide to which 57.3 parts of 5-nitro-1,3-phenylenebis(sulfonyl chloride) is added rapidly dropwise with vigorous stirring. After addition is complete, aqueous sodium bisulfite solution is added with stirring until no free iodine remains. The solid product is separated from the aqueous reaction mixture by filtration and the product is washed thoroughly with water and acetone. There is obtained 31 parts (93% yield) of a yellow powder which is a polysulfide of the following structure:

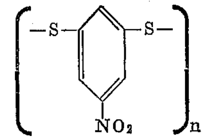

*Anal.*—Calc'd for $(C_6H_3NO_2S_2)$: C, 38.4; H, 1.60; N, 7.50; S, 34.5. Found: C, 38.9; H, 1.63; N, 7.56; S, 34.6.

(2) *Preparation of the Nitroarylsulfur Pentafluoride*

A mixture of 60 parts of the polydisulfide obtained in Part 1, 550 parts of silver difluoride and about 280 parts of trichlorotrifluoroethane is treated as described in Example B. There is obtained 14.0 parts of 5-nitro-1,3-phenylenebis(sulfur pentafluoride), B.P. 92–93.5° C. at 2.4 mm., M.P. 71–72° C. The identity of the compound, which has the structure

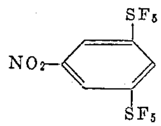

is confirmed by nuclear magnetic resonance, infrared and ultraviolet absorption spectra and by elemental analysis.

*Anal.*—Calc'd for $C_6H_3NO_2S_2F_{10}$: C, 19.2; H, 0.81; N, 3.74; S, 17.1; F, 50.6. Found: C, 19.2; H, 0.93; N, 3.70; S, 16.7; F, 50.5

(3) *Preparation of the Aminoarylsulfur Pentafluoride*

A Parr hydrogenation unit is employed as described in Example A, Part 2 The pressure vessel is charged with 9.7 parts of 5-nitro-1,3-phenylenebis(sulfur pentafluoride), 78–80 parts of absolute ethanol, about 4.5 parts of a 5 N solution of hydrogen chloride in absolute ethanol and 0.3 part of a commercial platinum oxide catalyst. The hydrogenation is conducted at 40 lbs. hydrogen pressure. An additional 0.15 part of platinum oxide catalyst is supplied to the reaction mixture during the process to insure complete hydrogenation. The reaction product is purified as described in Example A and there is obtained 7.5 parts of the hydrochloride of 5-amino-1,3-phenylenebis(sulfur pentafluoride), a cream-colored, fluffy, crystalline solid. The identity of the compound is confirmed by infrared and ultraviolet spectra and by elemental analysis.

*Anal.*—Calc'd for $C_6H_5NS_2F_{10}\cdot HCl$: C, 18.9; H, 1.59; N, 3.67; F, 49.8. Found: C, 19.3; H, 1.60; N, 3.22; F, 50.45.

The free amino compound is obtained by adding 4.33 parts of the preceding hydrochloride slowly and with stirring to about 100 parts of a 10% aqueous solution of sodium carbonate. The compound is extracted from the aqueous solution with ether and purified as described in Example A. There is obtained 2.8 parts of 5-amino-1,3-phenylenebis(sulfur pentafluoride), a crystalline white solid, M.P. 80.7–81.5° C. The identity of the compound is confirmed by infrared, ultraviolet and nuclear magnetic resonance spectra and by elemental analysis.

*Anal.*—Calc'd for $C_6H_5NS_2F_{10}$: C, 20.9; H, 1.46; N, 4.06; F, 55.03. Found: C, 21.2; H, 1.48; N, 4.04; F, 55.35.

EXAMPLE D

This example illustrates the preparation of an aminoarylsulfur pentafluoride in which the aryl group is polycyclic and the amino and sulfur pentafluoride groups are bonded to nuclear carbons in different rings. The preparation of the intermediate reactant is also described.

(1) *Preparation of 2'- and 4'-Nitrobiphenyl-3-Sulfur Pentafluoride*

A solution of 25.4 parts of the hydrochloride of p-aminophenylsulfur pentafluoride is prepared in 10 parts of water, 10 parts of ice and about 12 parts of concentrated hydrochloric acid. A solution of 7.6 parts of sodium nitrite in 10 parts of water is added gradually to the amine hydrochloride solution at −5° C. to form a solution of the diazonium salt. This solution is added rapidly and with vigorous stirring to about 240 parts of nitrobenzene cooled to 5–6° C. A solution of 30 parts of sodium acetate trihydrate in 80 parts of water is then added dropwise to the above nitrobenzene mixture at a temperature of approximately 5° C. and the mixture is stirred 3 hours at 5–10° C. The nitrobenzene layer which contains the reaction product is separated and the nitrobenzene removed by distillation. The residue is partially purified in a molecular still, the product being a mixture of liquid and solid materials. The mixture is further purified by elution chromatography, employing a column (1" x 24") of basic alumina (170 parts) and a 50% solution of benzene in n-hexane. By repeated crystallizations of purified material there is obtained 0.69 part of 4'-nitrobiphenyl-3-sulfur pentafluoride as pale yellow crystals, M.P. 128.6–129.0° C. and 2.05 parts of 2'-nitrobiphenyl-3-sulfur pentafluoride, also as pale yellow crystals, M.P. 81.0–81.7° C.

The identity of the compounds is confirmed by infrared, ultraviolet and nuclear magnetic resonance spectra and by elemental analysis.

*Anal.*—Calc'd for $C_{12}H_8NO_2SF_5$: C, 44.3; H, 2.48; F, 29.2; N, 4.31. Found for the 4'-nitro compound: C, 44.7; H, 2.58; F, 29.3; N, 3.83. Found for the 2'-nitro compound: C, 44.9; H, 2.60; F, 28.9; N, 3.92.

(2) *Preparation of Aminobiphenylsulfur Pentafluoride*

A Parr hydrogenation unit is employed as described in Example A, Part 2. A mixture of 2.0 parts of 2'-nitro-3-biphenylsulfur pentafluoride, 70–75 parts of absolute ethanol, approximately 1.0 part of a 5 N solution of hydrogen chloride in ethanol and 0.2 part of platinum oxide catalyst is hydrogenated under 40 lbs. hydrogen pressure. During the reaction 0.1 part of platinum oxide catalyst is added to insure complete hydrogenation of the nitro compound. The product is purified as described in Example A and there is obtained 1.43 parts of the hydrochloride of 2'-amino-3-biphenylsulfur pentafluoride, a while solid in the form of powdery crystals. The identity of the compound is confirmed by the infrared and ultraviolet spectra and by elemental analysis.

*Anal.*—Calc'd for $C_{12}H_{10}NSF_5\cdot HCl$: C, 43.44; H, 3.35. Found: C, 43.40; H, 3.98.

The free amine is obtained as described in Example A, Part 2, by treatment of the hydrochloride with sodium carbonate solution. The amine compound, i.e., 2'-amino-3-biphenylsulfur pentafluoride, generally is obtained as an oil which is difficult to crystallize.

The examples which follow described the preparation of the compounds of the present invention, i.e., the ureido-substituted arylsulfur pentafluorides, employing the aminoarylsulfur pentafluorides whose preparation is described in the previous examples.

EXAMPLE I

Dimethylcarbamyl chloride (4.2 parts) is added with stirring to a solution of 8 parts of m-aminophenylsulfur pentafluoride hydrochloride in 16 parts of pyridine. The mixture is heated for 1.5 hours at 100° C. and it is then cooled and poured into water. The crystals which form are separated by filtration and then dissolved in concentrated hydrochloric acid. The acid solution is filtered to remove impurities and the filtrate is poured into water to reprecipitate the product. The insoluble material is separated by filtration, dried in air and recrystallized from chloroform to give 4.7 parts of m-(3,3-dimethylureido)phenylsulfur pentafluoride, a white crystalline solid which melts at 204° C. and which has the following structure:

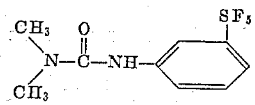

The identity of the compound is confirmed by elemental analysis.

*Anal.*—Calc'd for $C_9H_{11}F_5N_2OS$: C, 37.24; H, 3.82; F, 32.73. Found: C, 37.44; H, 4.13. F, 32.60.

EXAMPLE II

The preparation described in Example I is repeated except that 8 parts of p-aminophenylsulfur pentafluoride is employed in place of the m-aminophenylsulfur pentafluoride. There is obtained 3.4 parts of p-(3,3-dimethylureido)phenylsulfur pentafluoride, a white crystalline solid which melts at 187–188° C. and which has the following structure:

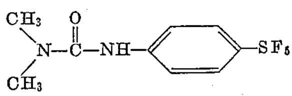

The identity of the compound is confirmed by elemental analysis.

*Anal.*—Calc'd for $C_9H_{11}F_5N_2OS$: F, 32.73. Found: F, 32.84.

By using the process described in Example I, diethylcarbamyl chloride is reacted with 3-amino-4-chlorophenylsulfur pentafluoride to obtain 4-chloro-3-(3,3-diethylureido)phenylsulfur pentafluoride and 3,3-diisopropylcarbamyl chloride is reacted with 4-amino-2-naphthylsulfur pentafluoride to yield 4-(3,3-diisopropylureido)naphthylsulfur pentafluoride. The broad application of the process of Examples I and II is further illustrated as follows:

m-Carboxyphenylsulfur pentafluoride is nitrated and reduced to 3-amino-5-carboxyphenylsulfur pentafluoride. This compound is esterified with ethyl alcohol to yield 3-amino-5-carbethoxyphenylsulfur pentafluoride which is then reacted as described in Example I with dimethylcarbamyl chloride to obtain 3-carbethoxy-5-(3,3-dimethylureido)phenylsulfur pentafluoride, a compound with the following structure:

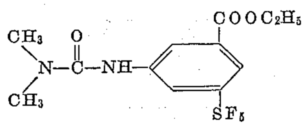

EXAMPLE III

An excess of hydrogen chloride is passed into a solution of 3 parts of 5-amino-1,3-phenylenebis(sulfur pentafluoride) in 30 parts of dioxane. Phosgene, in excess, is then passed into the solution at 80–90° C. The solution is placed under reduced pressure and about half the dioxane is removed together with the excess hydrogen chloride and phosgene. The solution which remains is evaporated on a steam bath and the liquid residue is washed with water. There is obtained 3.5 parts of a mixture of two solid ureas. The mixture is extracted with chloroform and the insoluble portion is separated by filtration. This portion is crystallized from dioxane to give 1.2 parts of (ureylenedi-s-phenenylene) tetrakis (sulfur pentafluoride), M.P. 303°C. The compound has the following structural formula:

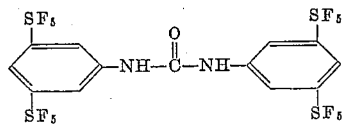

*Anal.*—Calc'd for $C_{13}H_8F_{20}N_2OS_4$: C, 21.79; H, 1.13; F, 53.04. Found: C, 22.63; H, 1.48; F, 52.65.

The chloroform soluble portion, obtained above, is crystallized from chloroform to give 1 part of 5-(3,3-dimethylureido)-1,3-phenylenebis(sulfur pentafluoride), M.P. 240–241° C. This compound has the following structural formula:

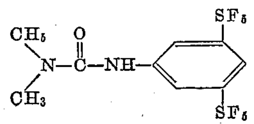

*Anal.*—Calc'd for $C_9H_{10}F_{10}N_2OS$: C, 25.01; H, 2.33; F, 43.95. Found: C, 26.08; H, 2.57; F, 45.37.

When arylamines are employed which are more basic than the amine of Example III, the unsymmetrically substituted ureas are the principal reaction products, as the following illustration shows:

2'-amino-3-biphenylsulfur pentafluoride hydrochloride is mixed with dioxane and phosgene is passed into the mixture until all of the material is in the solution. Excess phosgene and hydrogen chloride are removed with part of the dioxane by distillation and an equivalent amount of dibutylamine is added to the remaining solution. There is obtained as a crystalline solid 2'-(3,3-dibutylureido)-3-biphenylsulfur pentafluoride, a compound which has the following structure:

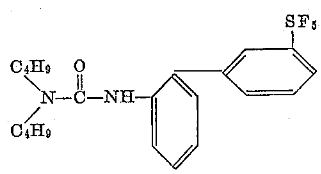

A further illustration of the process employing phosgene is as follows: p-Hydroxyphenylsulfur pentafluoride is dissolved in one molar equivalent of aqueous sodium hydroxide solution and reacted with dimethyl sulfate to form p-methoxyphenylsulfur pentafluoride. This compound is nitrated by conventional procedures to form 3-nitro-4-methoxyphenylsulfur pentafluoride which is reduced catalytically to 3-amino-4-methoxyphenylsulfur pentafluoride. The amine compound so obtained is dissolved in dioxane and the solution is treated with hydrogen chloride to convert the amine into its hydrochloride. Phosgene is passed in until a clear solution forms. Excess phosgene and hydrogen chloride are stripped off with part of the dioxane and dibutylamine is added in sufficient amount to form 3-(3,3-dibutylureido)-4-methoxyphenylsulfur pentafluoride, a compound which has the following structure:

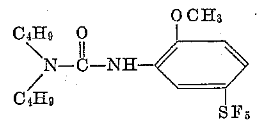

To obtain principally the symmetrically substituted ureas, i.e., ureas with arylsulfur pentafluoride groups bonded to each nitrogen of the urea, an arylamine bearing a sulfur pentafluoride group is reacted with phosgene in the presence of a base, e.g., pyridine, or the sulfur pentafluoride substituted arylamine hydrochloride is heated with urea until reaction occurs.

EXAMPLE IV p-Chlorophenylisocyanate (3 parts) is added with stirring to a solution of 5 parts of m-aminophenylsulfur pentafluoride hydrochloride in 10 parts of pyridine. The mixture is allowed to stand at room temperature (about 25° C.) for 1 hour. The mixture is poured into water and the solid product which forms is removed by filtration. The solid product is crystallized from methanol to give 6.7 parts of m-[3-(p-chlorophenyl)ureido] phenylsulfur pentafluoride, a white solid which melts at 203.5–205° C. and which has the following structure:

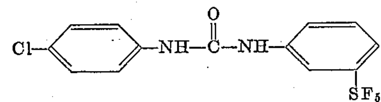

The identity of the compound is confirmed by elemental analysis.

*Anal.*—Calc'd for $C_{13}H_{10}ClF_5N_2OS$: Cl, 9.51; S, 8.60. Found: Cl, 9.98; S, 8.51.

The process of Example IV is applicable broadly to the reaction of isocyanates with aminoarylsulfur pentafluorides. Thus, allyl isocyanate and p-aminophenylsulfur pentafluoride yield p-(3-allylureido)phenylsulfur pentafluoride, α-naphthylisocyanate and m-aminophenylsulfur pentafluoride yield m-(3-naphthylureido)phenylsulfur pentafluoride, benzylisocyanate and 2'-amino-4-biphenylsulfur pentafluoride yield 2'-(3-benzylureido)-4-biphenylsulfur pentafluoride, methyl isocyanate and 5-amino-1,3-phenylenebis(sulfur pentafluoride) yield 5-(3-methylureido) - 1,3 - phenylenebis(sulfur pentafluoride), and cyclohexylisocyanate and p-aminophenylsulfur pentafluoride yield p-(3-cyclohexylureido)phenylsulfur pentafluoride.

EXAMPLE V m-Aminophenylsulfur pentafluoride (3.2 parts) and phenylisothiocyanate (2 parts) are mixed and heated at 100° C. for 1 hour. The syrupy product is scratched to induce crystallization and 5.2 parts of m-(3-phenylthioureido)phenylsulfur pentafluoride are obtained. The compound melts at 134–135° C. after recrystallization from a mixture of ether and carbon tetrachloride. It has the following structure:

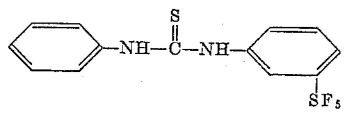

This compound is useful as a rubber vulcanization accelerator.

The compounds of this invention are of unusual biological interest, principally in the fields of herbicides and bactericides, as discussed more fully in the following paragraphs.

Ureidoarylsulfur pentafluorides which are unsymmetrically substituted are particularly valuable as herbicides. In this class of compounds, X in the generic formula is hydrogen, alkyl, or cycloalkyl; Y is alkyl or cycloalkyl. To illustrate, the compound of Example I, i.e., m-(3,3-dimethylureido)phenylsulfur pentafluoride, when applied to soil at the rate of 1–2 lbs. per acre, effectively controls grasses and broad leaf plants. Typical weeds which are controlled are Bermuda grass, crabgrass, pigweed and wild mustard. The effect of this type of compound of the invention is unique in that, in contrast to commercially available urea-type herbicides, the compound of Example I causes marked albinism in the plants. More particularly, the compound causes inhibition of chlorophyll formation. The plants turn white, pink or red because of the disapppearance of the green chlorophyll pigment.

The new compounds as described above are plant regulants which can be applied in a number of ways. Generally they are formulated by mixture with a conventional carrier material or conditioning agent. This provides a formulation adapted for ready and efficient application to soils, weeds, or unwanted plants using conventional applicator equipment. Thus, for the practice of the present invention, these compounds can be formulated into a plant regulant or herbicidal composition, such as described in Todd, U.S. Patents 2,655,444 through 2,655,447. Adjuvants, such as dusts, solvents, wetting, dispersing and emulsifying agents, set forth in U.S. Patent 2,426,417, can be employed in preparing the compositions containing the compounds of the present invention. Preferred compositions are in the form of water-dispersible powders which can be prepared by admixing one or more of the active compounds with, e.g., a surface-active agent and a finely divided solid carrier, such as talc, natural clay, diatomaceous earth and other powdered diluents. The surface-active agents are used in amounts sufficient to impart water dispersibility to the powder. Liquid compositions can also be prepared by intimately dispensing or dissolving one or more of the active compounds in conventional organic liquid herbicidal carriers.

For control of algae in water, one or more ureido-substituted arylsulfur pentafluorides are added to the water either in solution in a water-soluble organic solvent or as a finely dispersed wettable powder. If the water already contains algae contamination, a greater amount of the pentafluoride compound will be required than is necessary for prevention of such growth. In general, 1–100 parts of the pentafluoride are used per million parts of water for control of algae.

These compounds are also suitable for control of the growth of algae often noted on the soil around ornamental plants in flower beds and around potted plants. In such applications, an aqueous composition containing about 1 part per million of the pentafluoride is sprayed on the surface of the soil, causing bleaching of the algae and inhibiting their growth.

To further illustrate the effectiveness of the compounds of this invention in algae control, reference should be had to the following two examples.

EXAMPLE VI

A wettable powder containing the ingredients shown below is prepared by first blending the dry components, then micropulverizing until the particles are substantially all below 50 microns, followed by reblending.

| | Percent |
|---|---|
| m-(3,3 - dimethylureido)phenylsulfur pentafluoride | 80 |
| Alkyl naphthalene sulfonic acid, Na salt | 1.75 |
| Low viscosity methyl cellulose | 0.25 |
| Attapulgite clay | 18.00 |

This formulation is applied at the rate of 1 to 2 p.p.m. (active ingredient) to a growth of algae growing on the surface of soil. The algae show bleaching, retarded growth, and finally die.

EXAMPLE VII

| | Percent |
|---|---|
| m-[(3 - p-chlorophenyl)ureido]phenylsulfur pentafluoride | 30 |
| Polyacrylic acid (Carbopol 934) | 0.35 |
| 10% aqueous NaOH | 0.80 |
| Low viscosity polyvinyl alcohol | 1.00 |
| $Na_2HPO_4$ | 0.50 |
| Water | 67.35 |

The above components are mixed, then sand milled or ball milled as in Example VI. The resulting aqueous dispersion is used at the rate of 5 p.p.m. of active ingredient for the control of algae growing in a water supply used to supply an office air-conditioning system. This application rate causes bleaching of the algae followed by a cessation in growth.

The ureido-substituted arylsulfur pentafluorides, in which the nitrogens are unsymmetrically substituted as described earlier, can be used to great advantage in agriculture, especially as herbicides. They are, of course, applied to the locus or area to be protected from undesirable plant growth in amounts sufficient to exert the desired herbicidal action. The dosage is dependent upon the particular ureido-substituted arylsulfur pentafluoride and the nature of formulation used, type of treatment, type of vegetation to be controlled, climatic conditions, and the like. In general, when applied as a foliar spray, a dosage of about 0.1–10 lbs. of the active ingredient per acre is used. When used as a pre-emergence herbicide, both broad-leaved and grassy plants are controlled at this rate, e.g., 8 lbs. per acre. The compounds of this invention when applied in the general procedure described above control both broad-leaved and grassy annular and perennial weeds such as crabgrass, Johnson grass, wild mustard, dandelion, lamb's-quarters, rough pigweed and plantain.

Plants which have been treated with ureido-substituted arylsulfur pentafluorides having the ureido group in a position meta to the sulfur pentafluoride group, turn white or other colors ("albinism"). Accordingly, with this class of compounds, the effect of the herbicide and of the rate of dosage can be readily ascertained by a visual check.

The use of the compounds of this invention as herbicides is further illustrated by the following two formulation examples:

EXAMPLE VIII

The wettable powder shown below is prepared in the same manner as Example V.

| | Percent |
|---|---|
| p-(3,3-dimethylureido)phenylsulfur pentafluoride | 98 |
| Dodecyl benzene sulfonate | 2 |

This formulation is used at the rate of 1 pound (active) per acre preemergence for the prevention of chlorophyll formation in both broad-leaved and grassy plants such as crabgrass, chickweed, millet, ragweed, lamb's-quarters, water grass, and wild mustard. Death eventually occurs with these weeds while peanuts show no injury.

EXAMPLE IX

| | Percent |
|---|---|
| m-(3,3-dibutylureido)phenylsulfur pentafluoride | 5 |
| Sodium lauryl sulfate | 0.25 |
| Granular attapulgite (15–30 mesh) | 94.75 |

The above granular composition is prepared by first mixing the active and wetting agent with hydrated attapulgite, moistening the mixture with water, moist granulating the product, drying, regranulating and screening.

This granular composition is applied to the soil at the rate of 1.0 pound (active ingredient) per acre as a preemergence treatment for rice and carrots. The annual weeds emerge and show albinism effects along with yellow or red pigmentation at about 6 to 10 days after treatment. These weeds eventually die due to lack of chlorophyll formation while no injury to the economic crop is noted. As already indicated, such weeds as crabgrass, Johnson grass, giant foxtail, mustard, and pigweed are readily killed by this treatment.

The compounds of this invention also show antibacterial activity. This is particularly potent when Y is an aryl group in the general formula shown previously. For example, the compound of Example III, m-[3-(p-chlorophenyl)ureido]phenylsulfur pentafluoride, effectively destroys such bacteria as *Micrococcus pyogenes* (staphylococcus), *Streptococcus pyogenes, Neisseria catarrhalis, Sarcina lutea,* and *Bacillus subtilis* at the low concentration of 0.8 part per million. The type and potency of the antibacterial activity of these compounds, as a class, makes them particularly suitable for use as antibacterial agents in soaps.

The breadth of biological activity of these ureas is further exemplified by the fact that m-[3-(p-chlorophenyl)-ureido]phenylsulfur pentafluoride acts as an anthelmintic when tested against pinworms in mice at a dosage of 500 mg./kg.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. Compounds represented by the formula

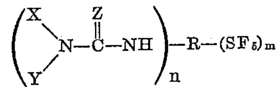

wherein R is a carbocyclic aromatic group of up to 24 nuclear carbons, *n* and *m* are positive whole numbers of from 1 to 3; Z is selected from the class consisting of oxygen and sulfur; X is selected from the class consisting of hydrogen, alkyl of up to 8 carbon atoms, alkenyl of 2 to 4 carbon atoms, cyclohexyl, benzyl, phenyl, halophenyl and naphthyl; and Y is selected from the class consisting of alkyl of up to 8 carbon atoms, alkenyl of 2 to 4 carbon atoms, cyclohexyl, benzyl, phenyl, halophenyl, naphthyl and arylsulfur pentafluoride.

2. m-(3,3-dimethylureido)phenylsulfur pentafluoride.

3. p-(3,3-dimethylureido)phenylsulfur pentafluoride.

4. m-[3-(p-chlorophenyl)ureido]phenylsulfur pentafluoride.

5. m-(3-phenylthioureido)phenylsulfur pentafluoride.

References Cited in the file of this patent

UNITED STATES PATENTS

| | | |
|---|---|---|
| 2,253,773 | Engel et al. | Aug. 26, 1941 |
| 2,473,878 | Cusic | Mar. 30, 1954 |
| 2,801,911 | Gilbert et al. | Aug. 6, 1957 |
| 2,876,088 | Hill et al. | Mar. 3, 1959 |
| 2,878,288 | Levine | Mar. 17, 1959 |
| 2,915,553 | Hildebrandt | Dec. 1, 1959 |

OTHER REFERENCES

Bergman: The Chemistry of Acetylene and Related Compounds, page 80 (Interscience Publishers, Inc., N.Y., 1948).